US012687738B2

(12) United States Patent (10) Patent No.: US 12,687,738 B2
Tsou et al. (45) Date of Patent: Jul. 21, 2026

(54) PROJECTION SYSTEM

(71) Applicant: InnoLux Corporation, Miao-Li County (TW)

(72) Inventors: Yu-Shih Tsou, Miao-Li County (TW); En-Jie Chen, Miao-Li County (TW); Tsung-Lun Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 250 days.

(21) Appl. No.: 18/736,554

(22) Filed: Jun. 7, 2024

(65) Prior Publication Data

US 2025/0013071 A1 Jan. 9, 2025

Related U.S. Application Data

(60) Provisional application No. 63/525,372, filed on Jul. 7, 2023.

(30) Foreign Application Priority Data

Mar. 28, 2024 (CN) .......................... 202410364124.1

(51) Int. Cl.
G02B 30/50 (2020.01)
(52) U.S. Cl.
CPC .................................... G02B 30/50 (2020.01)
(58) Field of Classification Search
CPC ................................. G02B 30/50; G02B 30/56
See application file for complete search history.

(56) References Cited

U.S. PATENT DOCUMENTS 8,867,136 B2 10/2014 Kofu
2001/0022563 A1* 9/2001 Ishikawa ................ G09G 3/003
345/9

FOREIGN PATENT DOCUMENTS

CN 102819178 B 5/2015
JP 2016212375 A * 12/2016

* cited by examiner

*Primary Examiner* — Paisley L Wilson
(74) *Attorney, Agent, or Firm* — Winston Hsu

(57) ABSTRACT

A projection system includes a display system, a first medium and a second medium. The display system is configured to emit a light to plan to display an image at a predetermined image forming position. The display system is disposed in the first medium having a first refractive index N1. The predetermined image forming position is located in the second medium having a second refractive index N2. The second medium has a first side and a second side, a distance FR is included between the first side and the second side, a first distance L1 is included between the predetermined image forming position and the display system, a second distance L2 is included between the display system and the second medium, the light has a brightness BS before the light entering the second medium, the light has an attenuation β in the second medium, and the distance FR satisfies:

$$(L1 - L2)\cot\left[\sin^{-1}\left(\frac{N1}{N2} \times \frac{1}{\sqrt{2}}\right)\right] \leq FR \leq 100 \times \log_{\beta}\frac{300}{BS}.$$

20 Claims, 8 Drawing Sheets

PROJECTION SYSTEM

CROSS REFERENCE TO RELATED APPLICATION

This application claims the benefit of U.S. Provisional Application No. 63/525,372, filed on Jul. 7, 2023. The content of the application is incorporated herein by reference.

BACKGROUND OF THE DISCLOSURE

1. Field of the Disclosure

The present disclosure relates to a projection system, and more particularly to a projection system capable of forming images in liquid medium or solid medium.

2. Description of the Prior Art

Current liquid image forming systems can display images by placing a display device in a liquid medium. However, the display device placed in the liquid medium may affect the objects in the liquid medium. Therefore, to improve the design of liquid image forming system is still an important issue in the present field.

SUMMARY OF THE DISCLOSURE

One of the purposes of the present disclosure is providing a projection system capable of display images in liquid medium or solid medium.

In some embodiments, a projection system is provided by the present disclosure. The projection system includes a display system configured to emit a light to plan to display an image at a predetermined image forming position, a first medium and a second medium. The display system is disposed in the first medium, and the first medium has a first refractive index N1. The predetermined image forming position is located in the second medium, and the second medium has a second refractive index N2 different from the first refractive index N1. The second medium has a first side and a second side opposite to the first side, the first side is located between the second side and the display system, a distance FR is included between the first side and the second side, a first distance L1 is included between the predetermined image forming position and the display system, a second distance L2 is included between the display system and the second medium, the light has a brightness BS before the light enters the second medium, the light has an attenuation β in the second medium, and the distance FR satisfies:

$$(L1 - L2)\cot\left[\sin^{-1}\left(\frac{N1}{N2} \times \frac{1}{\sqrt{2}}\right)\right] \leq FR \leq 100 \times \log_\beta \frac{300}{BS},$$

wherein a unit of the distance FR is centimeters.

These and other objectives of the present disclosure will no doubt become obvious to those of ordinary skill in the art after reading the following detailed description of the embodiment that is illustrated in the various figures and drawings.

DETAILED DESCRIPTION

Figure 1:
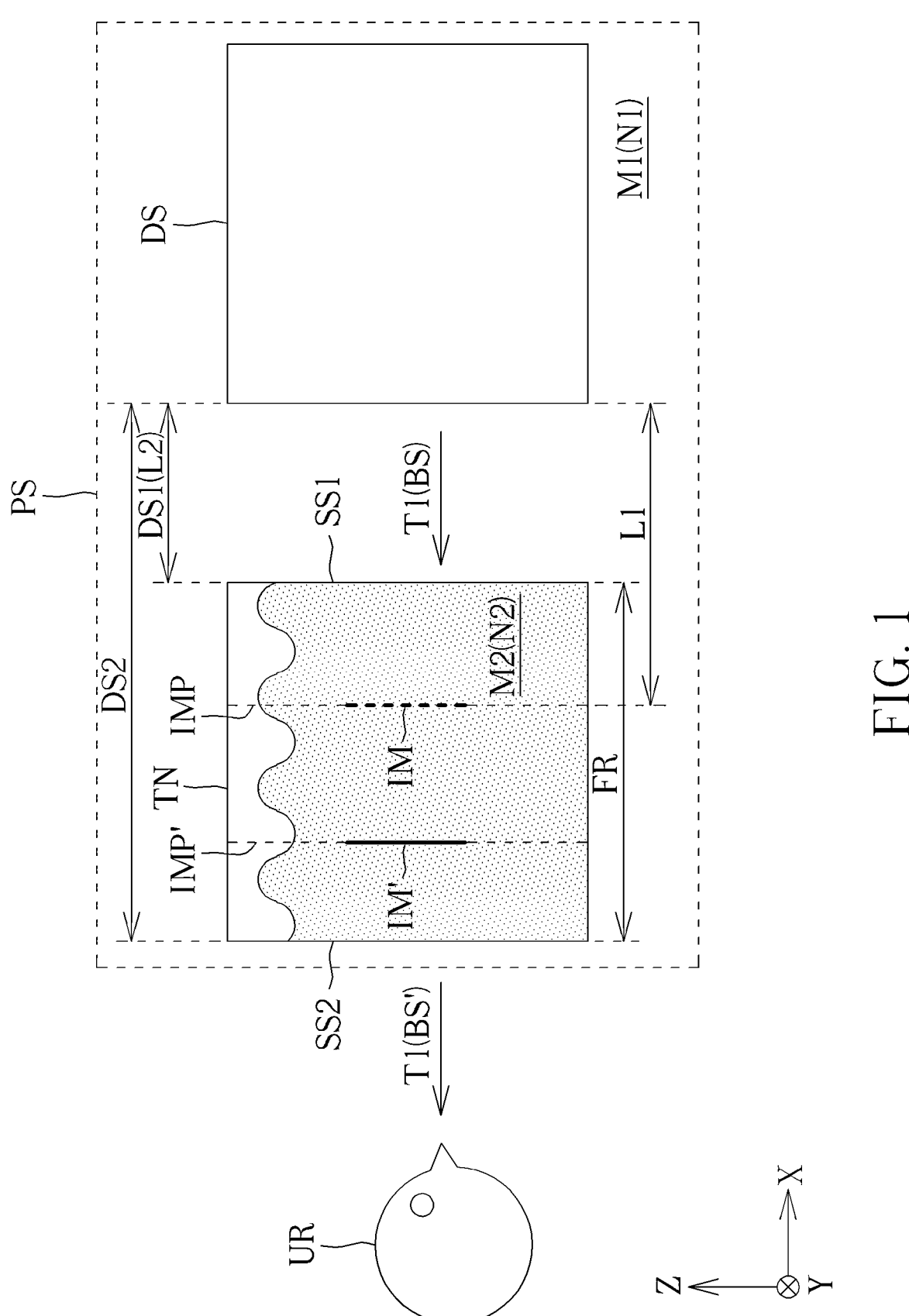
FIG. 1 schematically illustrates a projection system according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. When an element or a layer is referred to as being "electrically connected" to another element or layer, it can be a direct electrical connection or an indirect electrical connection. The electrical connection or coupling described in the present disclosure may refer to a direct connection or an indirect connection. In the case of a direct connection, the ends of the elements on two circuits are directly connected or connected to each other by a conductor segment. In the case of an indirect connection, switches, diodes, capacitors, inductors, resistors, other suitable elements or combinations of the above elements may be included between the ends of the elements on two circuits, but not limited thereto.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

According to the present disclosure, the thickness, length and width may be measured through optical microscope, and the thickness or width may be measured through the cross-sectional view in the electron microscope, but not limited thereto.

In addition, any two values or directions used for comparison may have certain errors. In addition, the terms "equal to", "equal", "the same", "approximately" or "substantially" are generally interpreted as being within ±20%, ±10%, ±5%, ±3%, ±2%, ±1%, or ±0.5% of the given value.

In addition, the terms "the given range is from a first value to a second value" or "the given range is located between a first value and a second value" represents that the given range includes the first value, the second value and other values there between.

If a first direction is said to be perpendicular to a second direction, the included angle between the first direction and the second direction may be located between 80 to 100 degrees. If a first direction is said to be parallel to a second direction, the included angle between the first direction and the second direction may be located between 0 to 10 degrees.

Unless it is additionally defined, all terms (including technical and scientific terms) used herein have the same meaning as commonly understood by those ordinary skilled in the art. It can be understood that these terms that are defined in commonly used dictionaries should be interpreted as having meanings consistent with the relevant art and the background or content of the present disclosure, and should not be interpreted in an idealized or overly formal manner, unless it is specifically defined in the embodiments of the present disclosure.

It should be noted that the technical features in different embodiments described in the following can be replaced, recombined, or mixed with one another to constitute another embodiment without departing from the spirit of the present disclosure.

The projection system of the present disclosure may include an electronic device, wherein the electronic device may include a display device, a sensing device, an antenna device, a tiled device, a wearable device (such as an augmented reality device or a virtual reality device), other suitable devices or combinations of the above-mentioned devices, but not limited thereto. The electronic device may be a foldable electronic device, a flexible electronic device or a stretchable electronic device. The display device may include a non-self-emissive display device or a self-emissive display device. The non-self-emissive display device for example includes a liquid crystal display device, but not limited thereto. The self-emissive display device for example includes a light emitting diode display device, but not limited thereto. The display device may for example be applied to laptops, common displays, tiled displays, vehicle displays, touch displays, televisions, monitors, smart phones, tablets, light source modules, lighting devices or electronic devices applied to the products mentioned above, but not limited thereto. The sensing device may include a biosensor, a touch sensor, a fingerprint sensor, other suitable sensors or combinations of the above-mentioned sensors. The antenna device may for example include a liquid crystal antenna device or a non-liquid crystal antenna device, but not limited thereto. The tiled device may for example include a tiled display device or a tiled antenna device, but not limited thereto. The outline of the electronic device may be a rectangle, a circle, a polygon, a shape with curved edge or other suitable shapes. The electronic device may include electronic units, wherein the electronic units may include passive elements or active elements, such as capacitor, resistor, inductor, diode, transistor, sensors, and the like. The diode may include a light emitting diode or a photo diode. The light emitting diode may for example include an organic light emitting diode (OLED) or an inorganic light emitting diode. The inorganic light emitting diode may for example include a mini light emitting diode (mini LED), a micro light emitting diode (micro LED) or a quantum dot light emitting diode (QLED), but not limited thereto. It should be noted that the electronic device in the projection system of the present disclosure may be combinations of the above-mentioned devices, but not limited thereto. The electronic device may include peripheral systems such as driving systems, controlling systems, light source systems to support display devices, antenna devices, wearable devices (such as augmented reality devices or virtual reality devices), vehicle devices (such as windshield of car) or tiled devices.

Referring to FIG. 1, FIG. 1 schematically illustrates a projection system according to a first embodiment of the present disclosure. According to the present disclosure, the projection system PS may include a display system DS, a first medium M1 and a second medium M2. In order to simplify the figure, FIG. 1 just simply shows the display system DS as a block, and the detailed structure of the display system DS is not shown. The display system DS is disposed in the first medium M1, or the display system DS may be placed in the first medium M1. In addition, the display system DS may be located outside the second medium M2, or the display system DS may not be disposed in the second medium M2, but not limited thereto. For example, the second medium M2 and the display system DS may be placed in the first medium M1 to form the projection system PS, but not limited thereto.

The display system DS may include any system or device that can display floating images, such as floating image display system, light field display system, holographic display system or other suitable devices, but not limited thereto. The display system DS can display images at any suitable position in the projection system PS, based on the disposition position and the structural design of the display system DS. The structure of the display system DS will be detailed in the following. According to the present disclosure, the display system DS is configured to emit a light (for example, the light T1) to plan to display an image IM in a predetermined image forming position IMP. The "predetermined image forming position IMP" mentioned here refers to the position where the image IM is displayed under the environment of the first medium M1 after the above-mentioned light is emitted from the display system DS. "The environment of the first medium M1" mentioned above refers to the environment in which only the first medium M1 is included, that is, the display system DS, the path of the light and the image forming position are all located in the first medium M1, but not in the second medium M2 or passing through the second medium M2. Specifically, "the predetermined image forming position IMP" may be defined as the position of the image (that is, the image IM) displayed by the display system DS when the projection system PS only includes the first medium M1 (that is, the second medium M2 is not included). That is, under the environment of the first medium M1, after the display system DS is placed, the display system DS may display the image IM, and the position where the image IM is located is the above-mentioned predetermined image forming position IMP. The image IM may for example be parallel to the plane formed by the direction Y and the direction Z (that is, the plane YZ), but not limited thereto. In some embodiments, the image IM is tilted from the plane YZ. It should be noted that although the image IM shown in FIG. 1 is a planar image, the present disclosure is not limited thereto. In some embodiments, the image IM may be a stereoscopic image. In the projection system PS, the predetermined image forming position IMP may for example be obtained through the following way. First, the display system DS may be placed in the environment of the first medium M1 at first, and then, the relative position of the display system DS and the image that the display system DS displays may be observed. "The relative position of the display system DS and the image that the display system DS displays" described herein may for example represent the distance between the display system DS and the position of the image that the display system DS displays (that is, the predetermined image forming position IMP). Specifically, a first distance L1 may be included between the predetermined image forming position IMP and the display system DS, wherein the value of the first distance L1 may be determined according to the design of the display system DS, and the value of the first distance L1 may not change with the change of the position of the display system DS in the first medium M1. Therefore, after the first distance L1 is confirmed, the position of the predetermined image forming position IMP may be obtained through the position of the display system DS in the projection system PS and the value of the first distance L1. In the present embodiment, the first distance L1 may be defined as the minimum distance between the predetermined image forming position IMP and the display system DS, but not limited thereto.

According to the present disclosure, the first medium M1 and the second medium M2 respectively include any suitable medium capable of allowing light to pass through, such that the light T1 emitted by the display system DS can pass through the first medium M1 and the second medium M2 to form an image. Specifically, the first medium M1 and the second medium M2 may respectively include a transparent medium or a high transmittance medium. The first medium M1 and the second medium M2 may be different mediums. In such condition, the first medium M1 has a first refractive index N1, and the second medium M2 has a second refractive index N2, wherein the first refractive index N1 is different from the second refractive index N2. In the present embodiment, the first medium M1 may be gas, and the second medium M2 may be solid or liquid. For example, the first medium M1 may be air, and the second medium M2 may be water, but not limited thereto. In another embodiment, the first medium M1 may be air, and the second medium M2 may be ice. It should be noted that in the embodiment that the second medium M2 includes liquid, the projection system PS may for example include a second medium unit, wherein the second medium unit may include a tank TN and the second medium M2 disposed in the tank TN, as shown in FIG. 1. In other words, the projection system PS may further include the tank TN to provide a space for accommodating the second medium M2. In another embodiment, when the second medium M2 includes solid, the projection system PS may not include the tank TN. The first medium M1 and the second medium M2 may respectively include any suitable transparent medium or high transmittance medium, which are not limited to the above-mentioned mediums.

According to the present disclosure, the display system DS may be disposed at any suitable position in the first medium M1, such that the above-mentioned predetermined image forming position IMP is located in the second medium M2. Specifically, after the display system DS is disposed in the first medium M1 of the projection system PS, the display system DS plans to display the image IM in the second medium M2. In other words, the display system DS and the image IM planned to be displayed by the display system DS are located in different mediums. Specifically, the first distance L1 between the above-mentioned predetermined image forming position IMP and the display system DS may be confirmed at first, and the disposition position of the display system DS in the first medium M1 may be determined based on the first distance L1, such that the predetermined image forming position IMP is located in the second medium M2. In detail, in a cross-sectional view of the projection system PS (for example, FIG. 1), the second medium M2 may have a first side SS1 and a second side SS2 opposite to the first side SS1, wherein the first side SS1 is located between the second side SS2 and the display system DS. A distance DS1 may be included between the first side SS1 and the display system DS, and a distance DS2 may be included between the second side SS2 and the display system DS, wherein the display system DS may be disposed at any suitable position in the first medium M1, such that the distance DS1 is less than or equal to the first distance L1, and the distance DS2 is greater than or equal to the first distance L1. Therefore, the predetermined image forming position IMP may be located in the second medium M2. When the first distance L1 is less than the distance DS1 or greater than the distance DS2, the predetermined image forming position IMP may be located outside the second medium M2. The distance DS1 and the distance DS2 may respectively be defined as the minimum distance between the first side SS1 and the display system DS and the minimum distance between the second side SS2 and the display system DS, but not limited thereto. It should be noted that when the projection system PS includes the tank TN for accommodating the second medium M2, the first side SS1 and the second side SS2 may be defined as two sides of the tank TN which are opposite to each other.

According to the present disclosure, since the first medium M1 and the second medium M2 are different mediums, the image displayed in the second medium M2 by the display system DS will deviate from the predetermined image forming position IMP, or the image actually displayed in the second medium M2 by the display system DS is not the image IM shown in FIG. 1. Specifically, as shown in FIG. 1, when the light T1 emitted by the display system DS enters the second medium M2, the display system DS will display an image IM' at a real image forming position IMP', wherein the image IM' is deviated from the predetermined image forming position IMP. In other words, the real image forming position IMP' is different from the predetermined image forming position IMP. In some embodiments, in the direction X, the predetermined image forming position IMP may be located between the image IM' and the display system DS, as shown in FIG. 1. In some other embodiments, in the direction X, the image IM' may be located between the predetermined image forming position IMP and the display system DS. In other words, the light T1 emitted by the display system DS will actually form an image at the real image forming position IMP' after the light T1 enters the second medium M2. According to the present disclosure, in a cross-sectional view of the projection system PS, a distance FR is included between the first side SS1 and the second side SS2, the first distance L1 is included between the predetermined image forming position IMP and the display system DS (as mentioned above), a second distance L2 is included between the display system DS and the second medium M2, the first medium M1 has the first refractive index N1, and the second medium M2 has the second refractive index N2, wherein the distance FR satisfies the following equation (1):

$$(L1 - L2)\cot\left[\sin^{-1}\left(\frac{N1}{N2} \times \frac{1}{\sqrt{2}}\right)\right] \leq FR \tag{1}$$

The distance FR may also be regarded as the width of the second medium M2 in the direction X. In some embodiments, when the projection system PS includes the tank TN, the distance FR may be regarded as the width of the tank TN. The units of the distances shown in FIG. (1) are centimeters (cm). The second distance L2 may be defined as the minimum distance between the display system DS and the second medium M2. For example, the second distance L2 may be the distance between the display system DS and the first side SS1 of the second medium M2. In such condition, the second distance L2 is the distance DS1 mentioned above.

According to the present disclosure, by making the distance FR located within the range in the above-mentioned equation (1), the real image forming position IMP' (or the image IM') may be located in the second medium M2, thereby achieving the effect that the image can be displayed in the second medium M2 through the display system DS located outside the second medium M2. Specifically, by making the distance FR located within the range in the above-mentioned equation (1), the image IM' may still be located in the second medium M2 even if the image IM' (or the real image forming position IMP') is deviated from the predetermined image forming position IMP. In detail, the display system DS may be placed in any suitable position in the first medium M1, such that the predetermined image forming position IMP may be located in the second medium M2. After that, the above-mentioned conditions, such as the distance (that is, the first distance L1) between the position (that is, the predetermined image forming position IMP) of the image (that is, the image IM) displayed by the display system DS under the environment of the first medium M1 (that is, the environment in which only the first medium M1 is included) and the display system DS, the distance (that is, the second distance L2) between the display system DS and the second medium M2, the first refractive index N1 of the first medium M1, and the second refractive index N2 of the second medium M2 may be confirmed, and the width of the second medium M2 (that is, the distance FR) may be designed based on the above-mentioned equation (1), such that the display system DS can display image in the second medium M2. In such design, the display system DS may still display image in the second medium M2 but not disposed in the second medium M2. Therefore, the effect of the display system DS on the objects in the second medium M2 may be reduced, thereby increasing applications of the projection system PS. For example, in an embodiment, the projection system PS may include the display system DS placed in air (the first medium M1, and the first refractive index is substantially 1) and an aquarium (the second medium M2, and the second refractive index is substantially 1.33), and after the first distance L1 between the position (that is, the predetermined image forming position IMP) of the image (that is, the image IM) displayed by the display system DS under the environment of air and the display system DS and the distance (that is, the second distance L2) between the display system DS and the aquarium are confirmed, the width of the aquarium may be designed according to equation (1), such that the display system DS can display image in the aquarium. Or, the distance (that is, the second distance L2) between the display system DS and the aquarium may be designed based on the width of the aquarium. Since the display system DS is not disposed in the aquarium, the display system DS does not affect the movement of creatures in the aquarium or occupy the space in the aquarium. It should be noted that the above-mentioned application is exemplary, and the present disclosure is not limited thereto. In addition, although the image IM' shown in FIG. 1 is the image parallel to the plane YZ, the present disclosure is not limited thereto.

In the present embodiment, in the direction X, the user UR can observe the image IM' displayed by the display system DS at the side of the second medium M2 opposite to the display system DS, that is, the second medium M2 may be located between the user UR and the display system DS, but not limited thereto. In some embodiments, the user UR can observe the image IM' in the second medium M2 in any direction. In other words, the light T1 emitted by the display system DS may pass through the second medium M2 at first, and then be observed by the user UR. The brightness of the light may reduce after the light passes through the second medium M2. Specifically, the light T1 has a brightness BS before the light T1 enters the second medium M2, and the light T1 has a brightness BS' after the light T1 passes through the second medium M2, wherein the brightness BS' is less than the brightness BS. The degree of brightness reduction of light after it passes through the second medium M2 may be determined according to the attenuation β of the light in the second medium M2. When the attenuation β is greater, the brightness (that is, the brightness BS') of the light may be lower after the light passes through the second medium M2. According to the present embodiment, the attenuation β of the light in the second medium M2 may for example be measured through the following way. First, a laser light may be emitted through a laser light emitting instrument, and the laser light may pass through a tank including the second medium M2 and having a width of 10 cm. After that, the brightness IL of the laser light before it passes through the second medium M2 and the brightness IS after it passes through the second medium M2 may be measured through any suitable brightness measurement equipment, and the attenuation β may be obtained through the following equation (2):

$$\beta = \left(\frac{IS}{IL}\right)^{10} \tag{2}$$

According to the present embodiment, the distance FR mentioned above, the brightness BS of the light T1 emitted by the display device DS before it enters the second medium M2, and the attenuation β of the light in the second medium M2 may satisfy the following equation (3):

$$FR \leq 100 \times \log_\beta \frac{300}{BS} \tag{3}$$

In equation (3), the unit of the distance FR is centimeter, and the unit of the brightness BS is nit.

By making the distance FR located within the range in equation (3), the possibility that the brightness of the light after it passes through the second medium M2 is too low and affecting the experience of the user UR may be reduced. Specifically, by making the distance FR, the brightness BS, and the attenuation β satisfy the above-mentioned equation (3), the brightness of the light after it passes through the second medium M2 may at least be 300 nits, thereby reducing the condition that the brightness of the image IM' observed by the user UR is too low. For example, in an embodiment, the brightness BS of the light T1 emitted by the display system DS is 600 nits, and the attenuation β of the light in the second medium M2 is 0.5. In such condition, the distance FR (or the width of the second medium M2) may be designed to be less than or equal to 100 centimeters, but not limited thereto.

Therefore, after combining the equation (1) and the equation (3), the range of the distance FR between the first side SS1 and the second side SS2 of the second medium M2 (or the width of the second medium M2) is shown in the following equation (4):

$$(L1 - L2) \cot \left[ \sin^{-1} \left( \frac{N1}{N2} \times \frac{1}{\sqrt{2}} \right) \right] \le FR \le 100 \times \log_\beta \frac{300}{BS} \quad (4)$$

According to the present disclosure, by making the distance FR (or the width of the second medium M2) located within the range of the equation (4), the image IM' can be displayed in the second medium M2 by the display system DS disposed in the first medium M1, wherein the brightness of the image IM' observed by the user may be maintained above a required brightness (for example, 300 nits, but not limited thereto), thereby increasing the applications of the projection system PS or improving the experience of the user UR.

Other embodiments of the present disclosure will be described in the following. In order to simplify the description, the same elements or layers in the following embodiments would be labeled with the same symbol, and the features thereof will not be redundantly described. The differences between the embodiments will be detailed in the following. It should be noted that the features described in the embodiments can be applied to each other, and a feature is not limited to be applied to the structure of the embodiment in which the feature is described.

Figure 2:
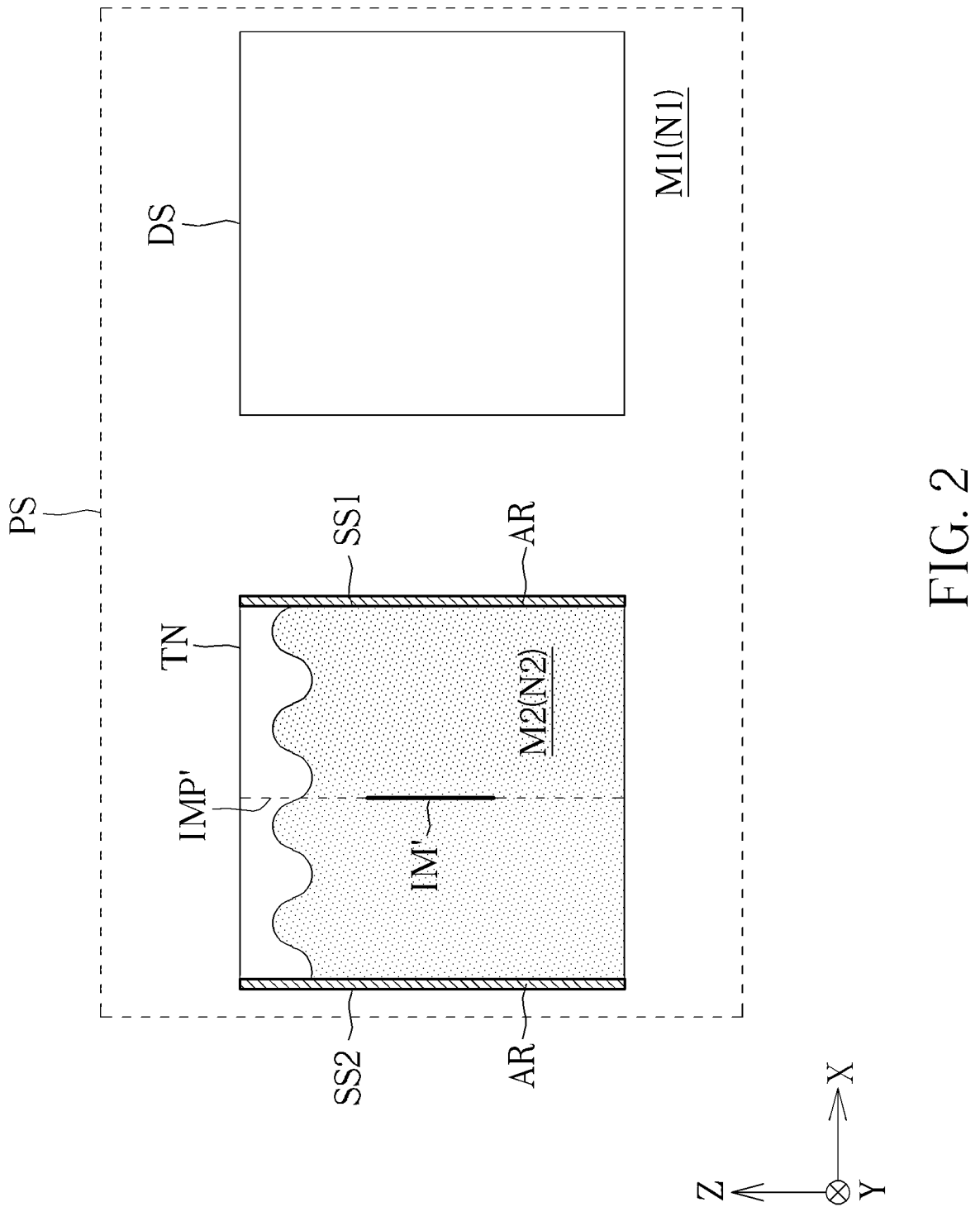
FIG. 2 schematically illustrates a projection system according to a second embodiment of the present disclosure.

Referring to FIG. 2, FIG. 2 schematically illustrates a projection system according to a second embodiment of the present disclosure. In order to simplify the figure, the predetermined image forming position IMP is not shown in FIG. 2. According to the present embodiment, the projection system PS may further include an anti-reflection layer AR, wherein the anti-reflection layer AR may be disposed on the surface of the second medium M2. In some embodiments, the anti-reflection layer AR may be disposed on the surface of the first side SS1, that is, the anti-reflection layer AR may be disposed between the display system DS and the second medium M2. In such condition, when the second medium M2 includes solid, the anti-reflection layer AR may directly be disposed on the surface of the first side SS1 of the second medium M2 and contacts the second medium M2; and when the second medium M2 includes liquid and be accommodated in the tank TN, the anti-reflection layer AR may be disposed on the surface of the first side SS1 facing the display system DS (or the outer surface of the tank TN opposite to the second medium M2) or on the surface of the first side SS1 facing the second medium M2 (for example, the inner surface of the tank TN), but not limited thereto. In some embodiments, the anti-reflection layer AR may be disposed on the surface of the second side SS2. In such condition, when the second medium M2 includes solid, the anti-reflection layer AR may directly be disposed on the surface of the second side SS2 of the second medium M2 and contacts the second medium M2; and when the second medium M2 includes liquid and be accommodated in the tank TN, the anti-reflection layer AR may be disposed on the surface of the second side SS2 facing the first side SS1 (or the inner surface of the tank TN) or on the surface of the second side SS2 opposite to the second medium M2 (for example, the outer surface of the tank TN), but not limited thereto. In some embodiments, the anti-reflection layer AR may be disposed on the inner surfaces and/or the outer surfaces of the first side SS1 and the second side SS2 simultaneously, and the disposition way thereof may refer to the contents above. The anti-reflection layer AR may include any suitable anti-reflection material. Specifically, the anti-reflection layer AR may be formed by coating anti-reflective material on the surface of the second medium M2 or the tank TN, but not limited thereto. By disposing the anti-reflection layer AR on the surface of the first side SS1 and/or the second side SS2 of the second medium M2, the possibility of light being reflected at the interfaces between the first medium M1 and the second medium M2 when the light enters the second medium M2 or be emitted from the second medium M2 may be reduced, thereby improving the experience of the user UR. The feature that the projection system PS includes the anti-reflection layer AR described in the present embodiment can be applied to the embodiments of the present disclosure. In some embodiments, the possibility of reflection of light may be reduced by placing the display system DS in the second medium M2. In such condition, the display system DS may be disposed to be biased toward a side of the first side SS1 to reduce the influence of the display system DS on the objects in the second medium M2.

Figure 3:
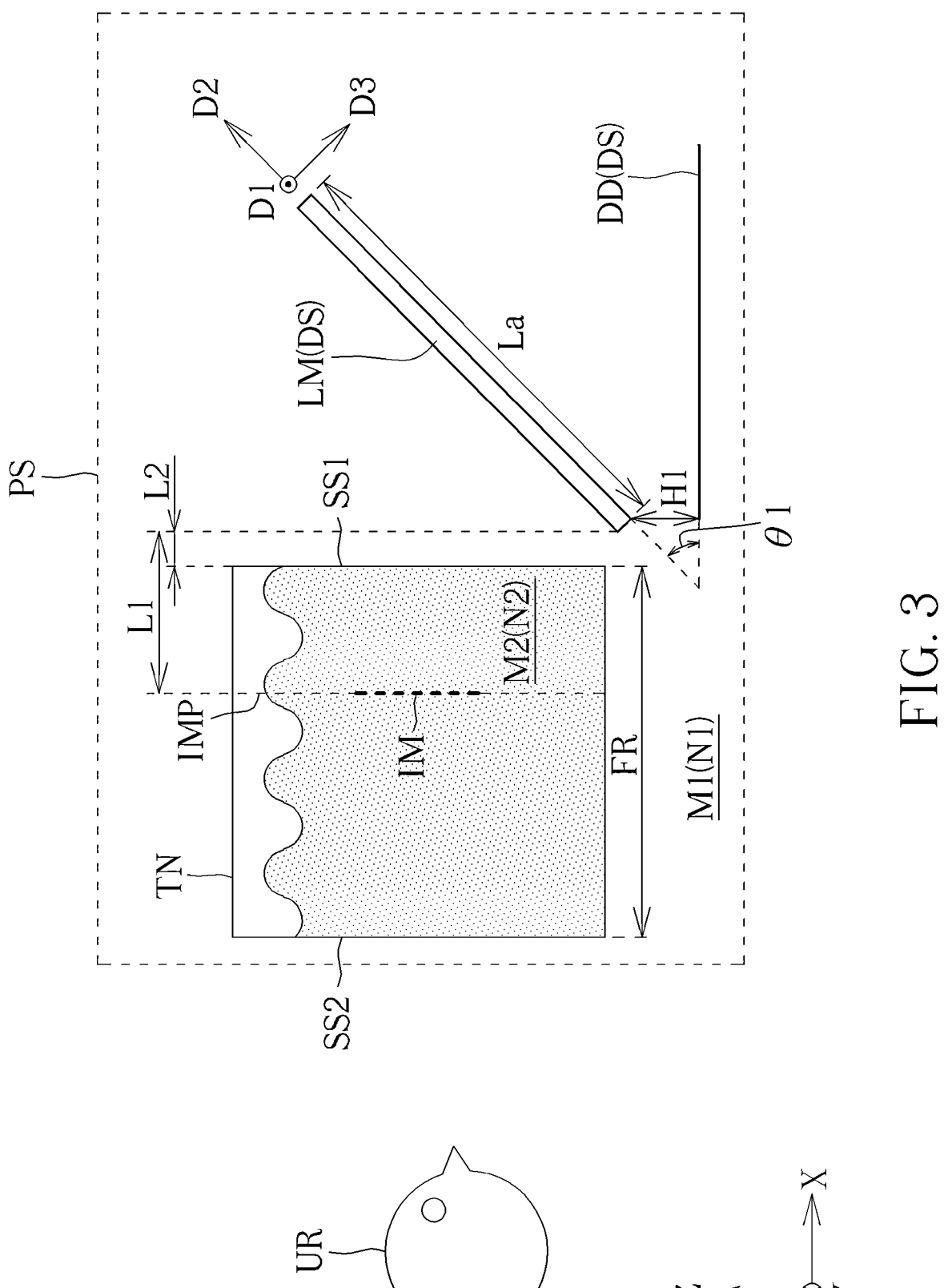
FIG. 3 schematically illustrates a projection system according to a third embodiment of the present disclosure.
Figure 4:
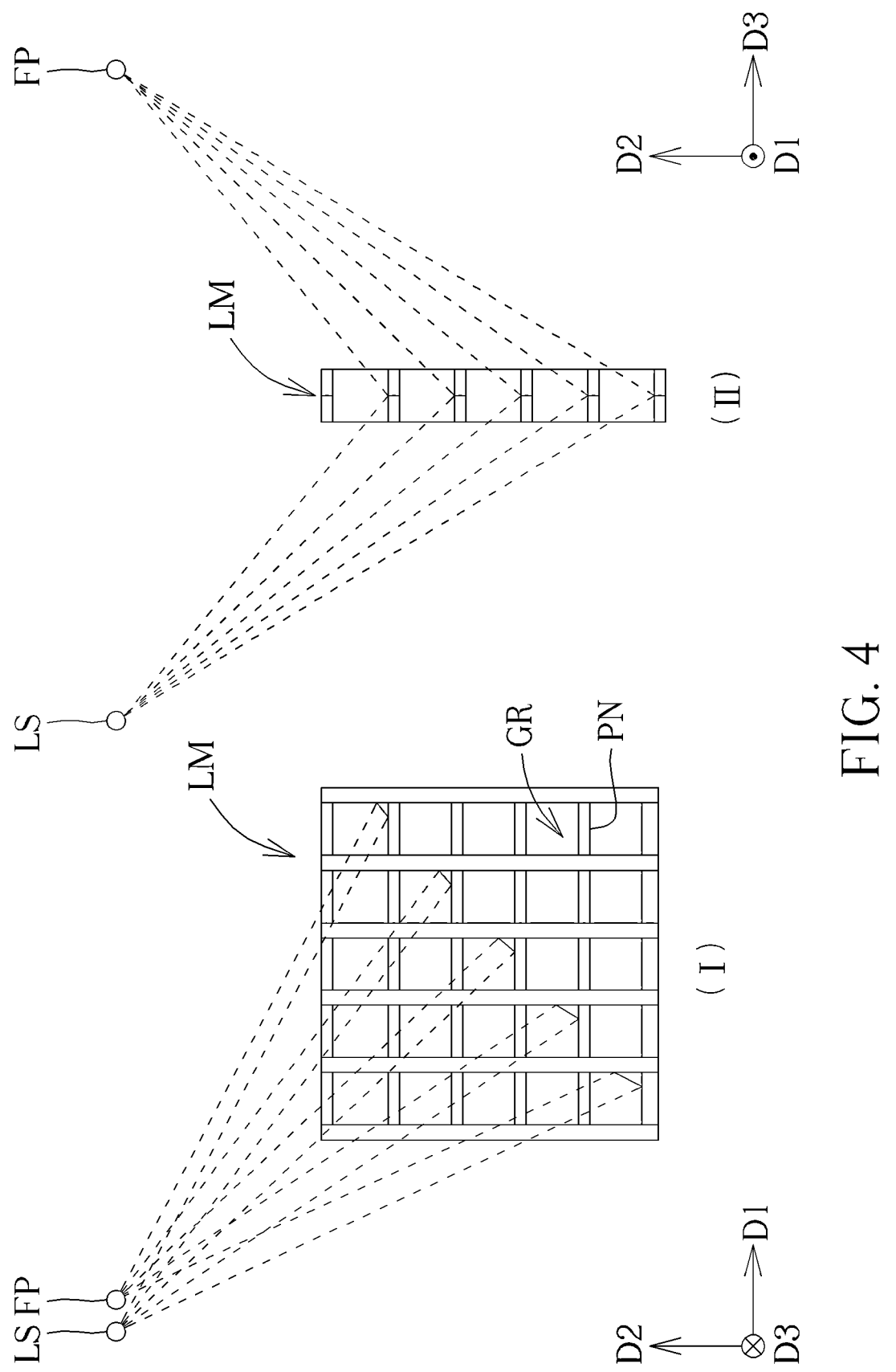
FIG. 4 schematically illustrates a structure of a light modulating element according to the third embodiment of the present disclosure.

Referring to FIG. 3 and FIG. 4, FIG. 3 schematically illustrates a projection system according to a third embodiment of the present disclosure, and FIG. 4 schematically illustrates a structure of a light modulating element according to the third embodiment of the present disclosure. According to the present embodiment, the display system DS in the projection system PS may include a light modulating element LM and a display device DD, or the display system DS may be composed of the light modulating element LM and the display device DD. The light modulating element LM and the display device DD are disposed in the first medium M1. The light modulating element LM and the display device DD may be located outside the second medium M2, but not limited thereto. The display device DD may include a display panel, wherein the display panel may be a self-emissive display panel or a non-self-emissive display panel, but not limited thereto. The non-self-emissive display panel for example includes a liquid crystal display panel, and the self-emissive display panel for example includes a light emitting diode display panel, but not limited thereto. The display device DD is exemplarily shown as a single layer in FIG. 3, and the detailed structure of the display device DD is not shown in FIG. 3. The display device DD may for example include a substrate, a circuit layer and a light emitting layer (or a light modulating layer) disposed on the substrate, or other suitable elements or layers. It should be noted that the display device DD may further include other suitable devices and is not limited to the above-mentioned devices.

The light modulating element LM is used to focus the light emitted by the display device DD on the side of the light modulating element LM opposite to the display device DD, thereby displaying an image. That is, the display device DD and the image displayed by the display device DD may respectively be located at two sides of the light modulating element LM. In other words, the display device DD can display a floating image through the light modulating element LM, and the display system DS may be a floating image display system. The light modulating element LM may include any suitable multiple reflection optical structure (such as a retro reflector, but not limited thereto). FIG. 4 shows the diagram of the structure of the light modulating element LM of the present embodiment at two different viewing angles. Specifically, as shown in FIG. 4, the light modulating element LM may be a plate-shaped element, wherein the plate-shaped element includes a plurality of grids GR arranged in an array. In detail, as shown in the structure (I) of FIG. 4, the light modulating element LM may have a mesh structure in a top view direction and include a plurality of grids GR, wherein the grids GR may be arranged along a direction D1 and a direction D2 to form an array. In addition, as shown in the structure (II) of FIG. 4, the light modulating element LM has a thickness in a side view direction, that is, the thickness of the plate-shaped element, wherein the thickness of the light modulating element LM may be defined in a direction D3. The direction D3 may be perpendicular to the direction D1 and the direction D2. In such condition, the plane of the light modulating element LM may be parallel to the plane formed of the direction D1 and the direction D2 (hereinafter referred to as the plane D12), and the plane D12 may be called the plane of the light modulating element LM. In addition, the direction D3 may be the thickness direction of the light modulating element LM. In the present embodiment, a grid GR of the light modulating element LM may be formed by being surrounded by four planes PN, wherein the planes PN may be reflective surfaces, such as mirror surfaces, but not limited thereto. That is, the light can be reflected by the plane PN when it is emitted to the plane PN. For example, a plate-shaped element having a plurality of grids GR may be formed of any suitable material (such as glass, but not limited thereto) at first, and then, the reflective material may be coated on the planes PN that surround the grids GR to form the reflective surfaces, but not limited thereto. Through the above-mentioned structure of the light modulating element LM, when the light emitted from a light source LS passes through the light modulating element LM, the portion of the light parallel to the direction D3 may penetrate through the light modulating element LM, and the portion of the light perpendicular to the direction D3 may be reflected by the planes PN of the light modulating element LM (for example, be reflected twice). In such condition, the light emitted from the light source LS will be focused on a focus point FP at the side of the light modulating element LM opposite to the light source LS, and the light source LS and the focus point FP may be symmetrical to each other by taking the light modulating element LM as the symmetry plane. In detail, in a coordinate system composed of the direction D1, the direction D2 and the direction D3, when the coordinates (D1, D2, D3) of the light source LS are (A1, B1, C1), the coordinates (D1, D2, D3) of the focus point FP where the light emitted by the light source LS is focused after passing through the light modulating element LM may be (A1, B1, −C1). That is, the D1-coordinates and the D2-coordinates of the light source LS and the focus point FP are the same, and the D3-coordinates of the light source LS and the focus point FP are opposite numbers. Therefore, the light emitted by the light source LS may form an image at the side of the light modulating element LM opposite to the light source LS in the thickness direction (the direction D3) of the light modulating element LM. It should be noted that the light source LS and the focus point FP shown in the structure (I) of FIG. 4 are actually at two sides of the light modulating element LM respectively, which is shown in the structure (II) of FIG. 4. In addition, the structure of the light modulating element LM shown in FIG. 4 is exemplary, and the present embodiment is not limited thereto.

Referring to FIG. 3 again, according to the present embodiment, the light modulating element LM and the display device DD may be disposed at any suitable position in the first medium M1, such that the display device DD can predetermine to display the image IM at the predetermined image forming position IMP. The features of the image IM and the predetermined image forming position IMP may refer to the contents mentioned above, and will not be redundantly described. Through the structure of the above-mentioned light modulating element LM, the display device DD and the predetermined image forming position IMP may respectively be located at two sides of the light modulating element LM in the thickness direction (the direction D3) of the light modulating element LM. In the present embodiment, in a normal direction (that is, the direction Z) of the display device DD, the light modulating element LM may be disposed on the display device DD, and the second medium M2 may be located at the left side or the right side (for example, at the left side shown in FIG. 3, but not limited thereto) of the light modulating element LM. In addition, in the normal direction of the display device DD, an included angle θ1 may be included between the light modulating element LM and the display device DD, wherein the included angle θ1 may range from 20 to 70 degrees (that is, $20° \leq θ1 \leq 70°$). In some embodiments, the included angle θ1 may range from 30 to 60 degrees (that is, $30° \leq θ1 \leq 60°$). In some embodiments, the included angle θ1 may range from 40 to 50 degrees (that is, $40° \leq θ1 \leq 50°$). For example, as shown in FIG. 3, the display device DD may be disposed to be parallel to the plane XY, the light modulating element LM may be disposed on the display device DD such that the included angle θ1 between the light modulating element LM and the display device DD is 45 degrees, and the second medium M2 may be disposed at the left side of the light modulating element LM, but not limited thereto. Through the above-mentioned disposition way, the image IM planned to be displayed by the display device DD is located in the second medium M2. It should be noted that the disposition way of the display system DS shown in FIG. 3 is exemplary, and the present embodiment is not limited thereto.

According to the present embodiment, a minimum distance H1 may be included between the light modulating element LM and the display device DD in the normal direction of the display device DD. For example, as shown in FIG. 3, the minimum distance H1 may be the distance between the lower end of the light modulating element LM and the top surface of the display device DD in the normal direction of the display device DD, but not limited thereto. The display device DD may have a center brightness BC. Specifically, the center brightness BC may be the brightness of the display device DD measured at the center of the display device DD. The center brightness BC may be the brightness of the light emitted from the center of the display device DD before it enters the light modulating element LM. In some embodiments, the center brightness BC may be the same as the above-mentioned brightness BS (the brightness before the light enters the second medium M2). The display device DD may have a light source (not labeled) to plan to display the image IM, wherein the light source may have a lumen maintenance α, and the image IM may have a brightness Bi. The lumen maintenance α may be obtained through the following way. First, the luminous intensity I0 of the light source of the display device DD may be measured through a brightness measurement device (such as a display measuring system (DMS), but not limited thereto) at a distance of 0 cm from the display device DD, and then, the luminous intensity I1 of the light source of the display device DD may be measured at a distance of 100 cm from the display device DD, wherein the lumen maintenance α of the light source of the display device DD may be I1/I0. The light modulating element LM may have a length La, wherein the length La may be defined as the length of the light modulating element LM in the direction D2. In addition, the light modulating element LM may have a light efficiency η. The light efficiency η may be measured through any suitable brightness measurement device in any suitable way. For example, in the measurement of the light efficiency η, the brightness measurement device may be used to measure the intensity of the incident light emitted into the incident surface of the light modulating element LM and the intensity of the outgoing light emitted from the light outgoing surface, and the light efficiency η of the light modulating element LM may be the ratio of the intensity of the outgoing light to the intensity of the incident light, but not limited thereto. According to the present embodiment, the minimum distance H1 may satisfy the following equation (5):

$$10 \le H1 \le \frac{1}{2}\left( \frac{\log \frac{Bi}{\eta \times BC}}{\log \alpha} \times 100 - \frac{La}{\sqrt{2}} \right) \tag{5}$$

In equation (5), the units of the minimum distance H1 and the length La are centimeters, and the units of the center brightness BC and the brightness Bi are nits.

According to the present embodiment, the parameters such as the minimum distance H1 between the light modulating element LM and the display device DD, the center brightness BS of the display device DD, the lumen maintenance α of the light source of the display device DD, the length La of the light modulating element LM, the light efficiency η of the light modulating element LM, and the like can be adjusted according to the above-mentioned equation (5), such that the brightness Bi of the image IM may be maintained above a required brightness (for example, 300 nits, but not limited thereto), thereby improving the experience of the user UR. For example, after the center brightness BS, the lumen maintenance α, the length La and the light efficiency η are confirmed, the minimum distance H1 between the light modulating element LM and the display device DD may be adjusted to adjust the brightness Bi of the image IM. For example, in an embodiment, the center brightness BC of the display device DD is 1700 nits, the lumen maintenance α of the light source of the display device DD is 0.9, the light efficiency η of the light modulating element LM is 0.25, and the length La of the light modulating element LM is 200 cm. In such condition, the minimum distance H1 may be designed to be 70 cm, such that the brightness Bi of the image IM is about 316 nits, which is greater than the above-mentioned required brightness.

In addition, in the present embodiment, the distance FR between the first side SS1 and the second side SS2 of the second medium M2 may satisfy the above-mentioned equation (1), such that the image actually displayed by the display system DS may still be located in the second medium M2. In detail, as mentioned above, the light emitted by the display system DS will form the image IM' (not shown) at the real image forming position IMP' (not shown) after it enters the second medium M2, wherein the real image forming position IMP' may be different from the predetermined image forming position IMP. In order to simplify the figure, the image IM' and the real image forming position IMP' where the image IM' is located are not shown in FIG. 3. It should be noted that the brightness Bi of the image IM mentioned above is also the brightness of the image IM', that is, the brightness of the image actually be observed by the user UR. Specifically, in the present embodiment, the first distance L1 in equation (1) may be defined as the minimum distance between the predetermined image forming position IMP and the light modulating element LM in the direction X. For example, the first distance L1 may be the distance between the predetermined image forming position IMP and the lower end of the light modulating element LM in the direction X, but not limited thereto. The second distance L2 in equation (1) may be defined as the minimum distance between the second medium M2 and the light modulating element LM in the direction X. For example, the second distance L2 may be the distance between the first side SS1 of the second medium M2 and the lower end of the light modulating element LM in the direction X, but not limited thereto. Therefore, the range of the distance FR may be designed through the equation (1).

Figure 5:
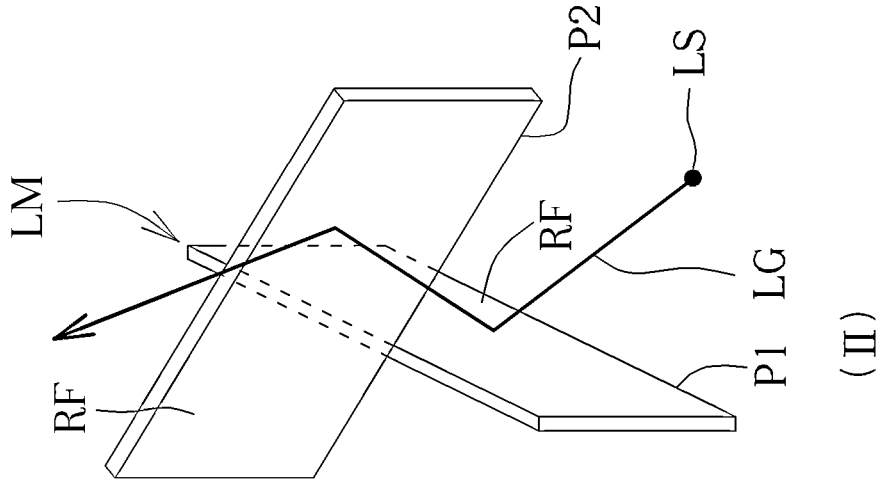
FIG. 5 schematically illustrates a structure of a light modulating element according to a variant embodiment of the third embodiment of the present disclosure.
Figure 5:
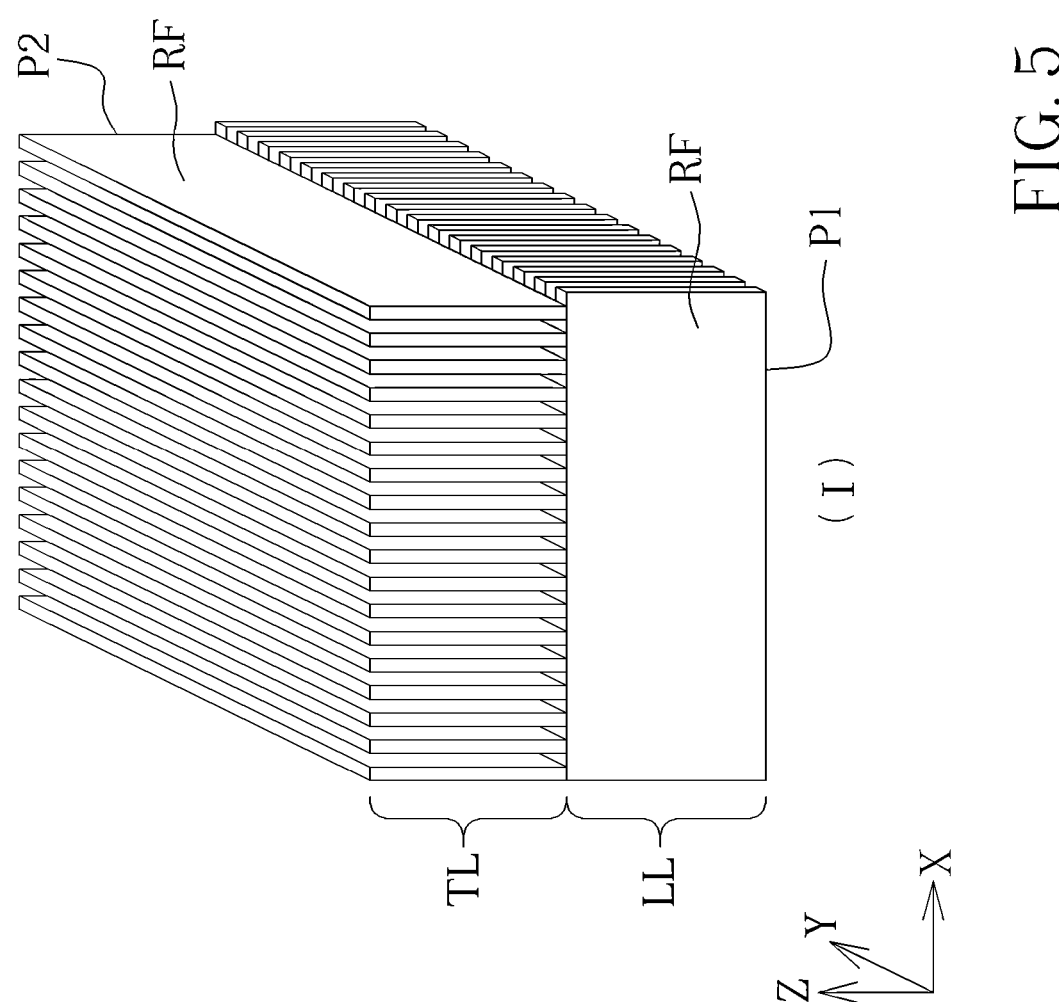

Referring to FIG. 5, FIG. 5 schematically illustrates a structure of a light modulating element according to a variant embodiment of the third embodiment of the present disclosure. According to the present variant embodiment, the light modulating layer LM may include a double-layer structure, wherein the double-layer structure includes a lower structure LL and an upper structure TL disposed on the lower structure LL. The lower structure LL may include a plurality of plate structures P1 extending along the direction X, and these plate structures P1 are arranged along the direction Y; the upper structure TL may include a plurality of plate structures P2 extending along the direction Y, and these plate structures P2 are arranged along the direction X. In other words, the extending direction of the plate structure P1 is perpendicular to the extending direction of the plate structure P2, and the arranging direction of the plate structure P1 is perpendicular to the arranging direction of the plate structure P2. The plate structure P1 and the plate structure P2 may respectively include a reflective surface RF, such as a mirror surface, but not limited thereto. The reflective surfaces RF of the plurality of plate structures P1 may face toward the same direction, such as the direction X. The reflective surfaces RF of the plurality of plate structures P2 may face toward the same direction, such as the direction −Y. In some embodiments, the plate structure P1 and the plate structure P2 may respectively include multiple reflective surfaces RF, for example, the plate structure P1 and the plate structure P2 may respectively include a double-sided mirror structure. For example, a mirror surface may be formed on the surface of the plate-shaped glass to form the plate structure P1 and the plate structure P2, but not limited thereto. In other words, the light modulating element LM of the present variant embodiment may include a double-layer vertical mirror structure. FIG. 5 shows a plate structure P1 and a plate structure P2 in the light modulating element LM. Specifically, as shown in the structure (II) of FIG. 5, the light LG emitted from the light source LS will be reflected by the reflective surface RF of the plate structure P1 of the lower structure LL and the reflective surface RF of the plate structure P2 of the upper structure TL when the light LG passes through the light modulating element LM (that is, the light LG will be reflected twice), thereby forming an image at the side of the light modulating element LM opposite to the light source LS. The light modulating element LM of the present variant embodiment may be applied to the display system DS shown in FIG. 3.

Figure 6:
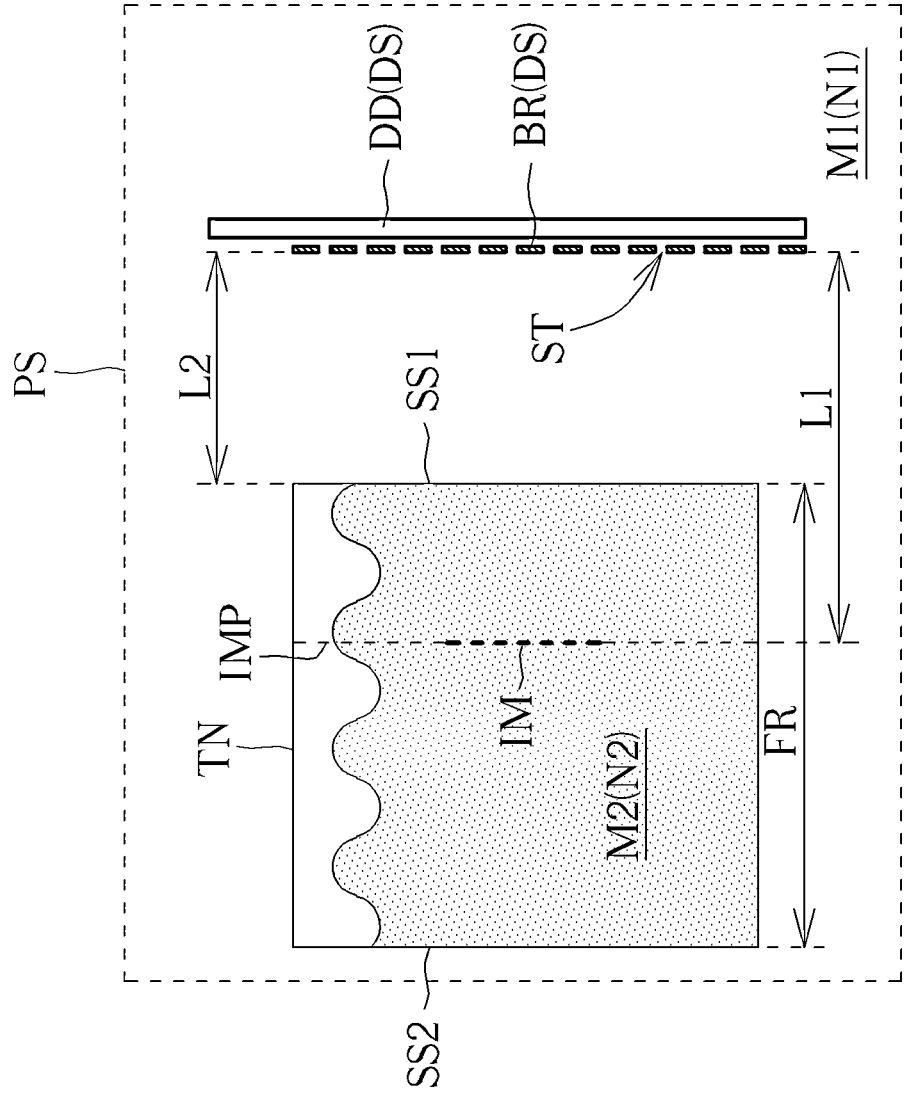
FIG. 6 schematically illustrates a projection system according to a fourth embodiment of the present disclosure.
Figure 6:
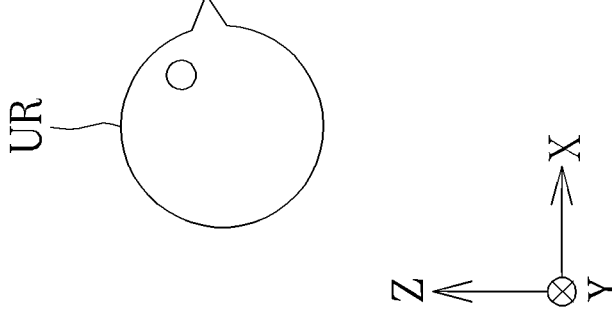

Referring to FIG. 6, FIG. 6 schematically illustrates a projection system according to a fourth embodiment of the present disclosure. The display system DS in the projection system PS of the present embodiment may include a light field display system, such as a barrier type light field display system. In detail, as shown in FIG. 6, the display system DS may include the display device DD and the mask BR disposed on the light output surface of the display device DD. The mask BR includes a plurality of slits ST, such that the mask BR includes the structure in which light stripes and dark stripes are alternately arranged. The mask BR is located between the display device DD and the second medium M2. The feature of the display device DD may refer to the contents related to FIG. 3, and will not be redundantly described. The display system DS may be disposed at any suitable position in the first medium M1, such that the display system DS may plan to display the image IM in the second medium M2. The distance FR between the first side SS1 and the second side SS2 of the second medium M2 may satisfy the equation (4) above, such that the actual position of the image displayed by the display system DS in the second medium M2 (that is, the above-mentioned real image forming position IMP', which is not shown in FIG. 6) may still be located in the second medium M2. Specifically, in the present embodiment, the first distance L1 in equation (4) may be defined as the minimum distance between the predetermined image forming position IMP and the mask BR in the direction X, and the second distance L2 may be defined as the minimum distance between the first side SS1 of the second medium M2 and the mask BR in the direction X, but not limited thereto. The structure of the display system DS of the present embodiment may be applied to the projection systems PS in the above-mentioned embodiments.

Figure 7:
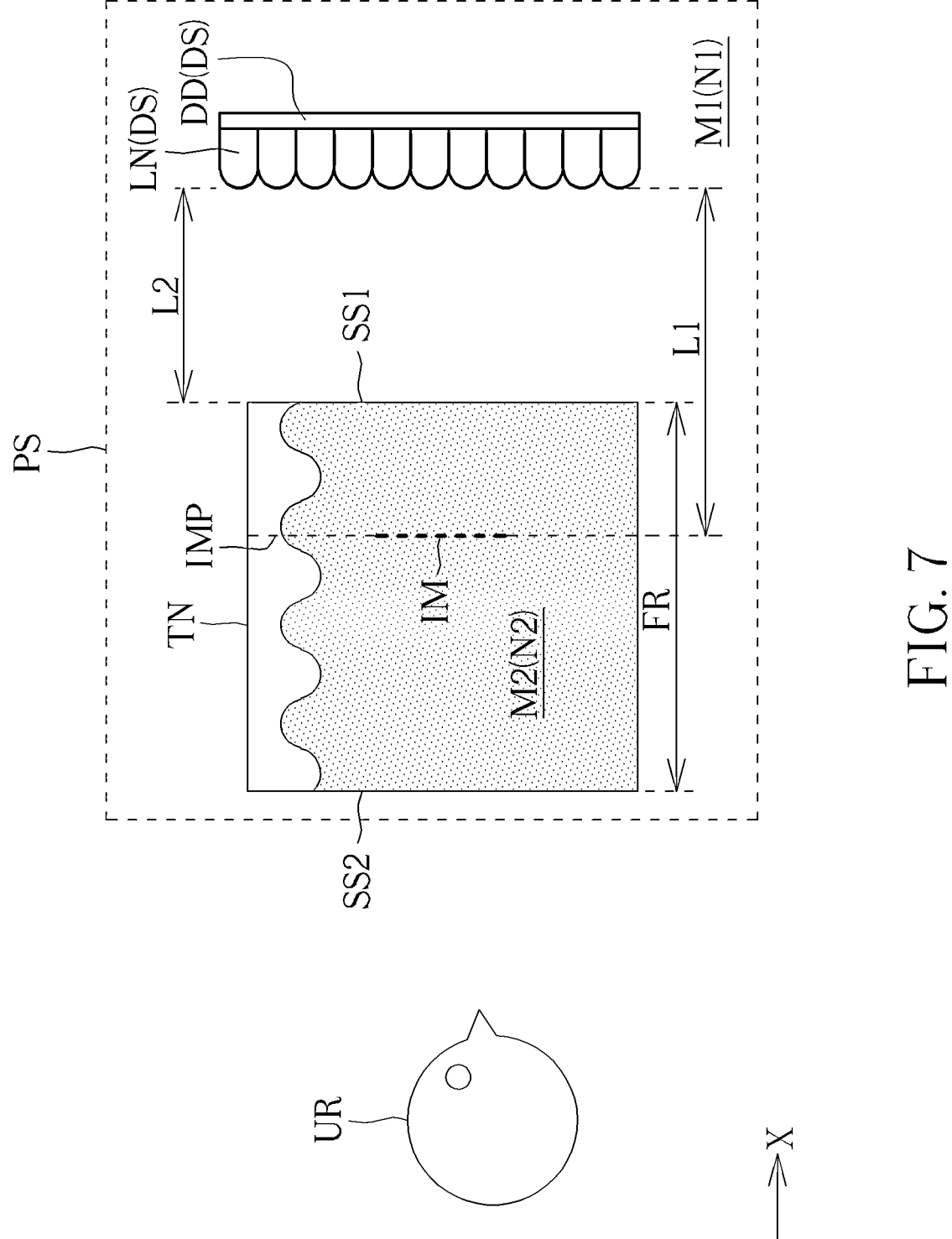
FIG. 7 schematically illustrates a projection system according to a fifth embodiment of the present disclosure.

Referring to FIG. 7, FIG. 7 schematically illustrates a projection system according to a fifth embodiment of the present disclosure. The display system DS in the projection system PS of the present embodiment may include a light field display system, such as a lens array type light field display system. In detail, as shown in FIG. 7, the display system DS may include the display device DD and a plurality of lens LN disposed on the light output surface of the display device DD, wherein the plurality of lens LN may be arranged in an array. The lens LN may be located between the display device DD and the second medium M2. The display system DS may be disposed at any suitable position in the first medium M1, such that the display system DS may plan to display the image IM in the second medium M2. The distance FR between the first side SS1 and the second side SS2 of the second medium M2 may satisfy the equation (4) above, such that the actual position of the image displayed by the display system DS in the second medium M2 (that is, the above-mentioned real image forming position IMP', which is not shown in FIG. 7) may still be located in the second medium M2. Specifically, in the present embodiment, the first distance L1 in equation (4) may be defined as the minimum distance between the predetermined image forming position IMP and the lens LN in the direction X, and the second distance L2 may be defined as the minimum distance between the first side SS1 of the second medium M2 and the lens LN in the direction X, but not limited thereto. The structure of the display system DS of the present embodiment may be applied to the projection systems PS in the above-mentioned embodiments.

Figure 8:
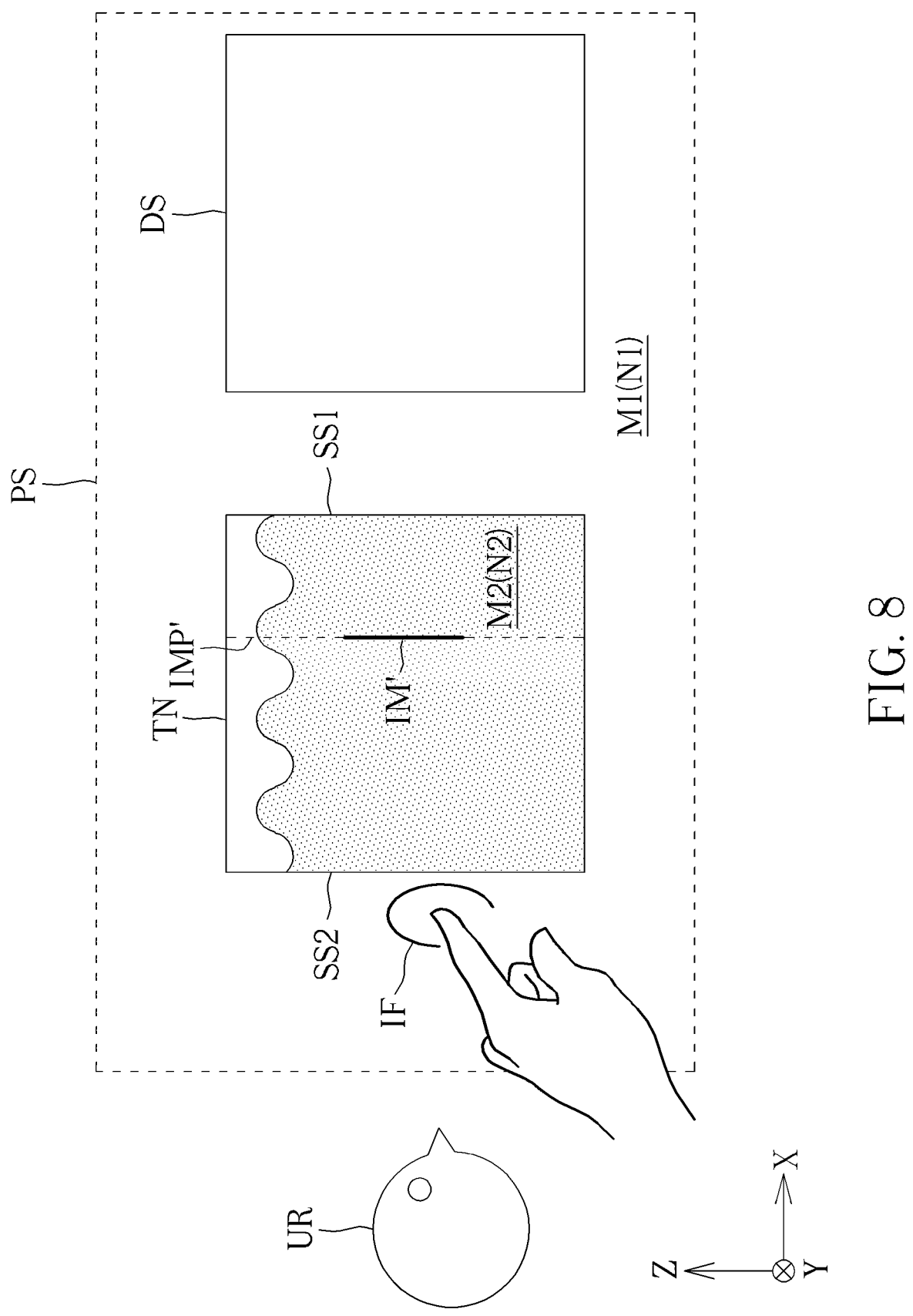
FIG. 8 schematically illustrates a projection system according to a sixth embodiment of the present disclosure.

Referring to FIG. 8, FIG. 8 schematically illustrates a projection system according to a sixth embodiment of the present disclosure. According to the present embodiment, the projection system PS may further include an interactive interface IF, and the user UR may interact with the image IM' displayed by the display system DS in the second medium M2 through the interactive interface IF. The interactive interface IF may be disposed at any suitable position in the projection system PS, which is not limited to what is shown in FIG. 8. In some embodiments, the interactive interface IF may include a keyboard, a mouse, a game controller or other suitable input devices, and the user UR may operate the image IM' through the interactive interface IF. In some embodiments, the interactive interface IF may be the surface of the tank TN for accommodating the second medium M2, that is, the user UR may interact with the image IM' by touching the surface of the tank TN. For example, the interactive interface IF may be the surface of the tank TN adjacent to the user UR, that is, the surface of the tank TN corresponding to the second side SS2. In some embodiments, the above-mentioned interactive interface IF may represent that the user UR can operate the image IM' through gesture control. For example, an image sensing device (not shown) may be included in the projection system PS to detect the movement of the user UR, such as the gesture or other suitable movements. By detecting movements through the image sensing device, the user may interact with the image IM' through the movements thereof. The image sensing device may for example include an infrared image sensor, a camera, or other suitable image capturing devices. It should be noted that the above-mentioned examples of the interactive interface IF are exemplary, and the present embodiment is not limited thereto. The interactive interface IF of the present embodiment may be applied to the projection systems PS in the above-mentioned embodiments.

In summary, a projection system including a first medium, a display system disposed in the first medium and a second medium is provided by the present disclosure. The display system may be disposed at any suitable position in the first medium, such that the display system can plan to display an image in the second medium. In addition, through the width design of the second medium, the image actually displayed by the projection system may still be located in the second medium even if the image is deviated from the predetermined image forming position. Furthermore, the width of the second medium is designed such that the brightness of the image displayed by the projection system is greater than the required brightness, thereby improving the experience of the user.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A projection system, comprising:
a display system configured to emit a light to plan to display an image at a predetermined image forming position;

a first medium, wherein the display system is disposed in the first medium, and the first medium has a first refractive index N1;

a second medium, wherein the predetermined image forming position is located in the second medium, and the second medium has a second refractive index N2 different from the first refractive index N1, wherein the second medium has a first side and a second side opposite to the first side, the first side is located between the second side and the display system, a distance FR is included between the first side and the second side, a first distance L1 is included between the predetermined image forming position and the display system, a second distance L2 is included between the display system and the second medium, the light has a brightness BS before the light enters the second medium, the light has an attenuation β in the second medium, and the distance FR satisfies:

$$(L1 - L2)\cot\left[\sin^{-1}\left(\frac{N1}{N2} \times \frac{1}{\sqrt{2}}\right)\right] \leq FR \leq 100 \times \log_\beta \frac{300}{BS},$$

wherein a unit of the distance FR is centimeters.

2. The projection system according to claim 1, wherein the image is displayed at a real image forming position after the light enters the second medium, and the real image forming position is located in the second medium and different from the predetermined image forming position.

3. The projection system according to claim 1, wherein a third distance is included between the first side and the display system, a fourth distance is included between the second side and the display system, the third distance is less than or equal to the first distance, and the fourth distance is greater than or equal to the first distance.

4. The projection system according to claim 1, further comprising an anti-reflection layer disposed between the display system and the second medium.

5. The projection system according to claim 1, further comprising an anti-reflection layer disposed on a surface of the second side facing the first side.

6. The projection system according to claim 1, wherein the display system includes a light modulating element and a display device, in a normal direction of the display device, the light modulating element is disposed on the display device and an included angle is included between the light modulating element and the display device, and the included angle ranges from 20 to 70 degrees.

7. The projection system according to claim 6, wherein the included angle ranges from 30 to 60 degrees.

8. The projection system according to claim 6, wherein the included angle is 45 degrees.

9. The projection system according to claim 6, wherein a minimum distance H1 is included between the light modulating element and the display device in the normal direction of the display device, the display device has a center brightness BC, the display device has a light source to display the image, the image has a brightness Bi, the light source has a lumen maintenance α, the light modulating element has a light efficiency η, the light modulating element has a length La, and the minimum distance H1 satisfies:

$$10 \leq H1 \leq \frac{1}{2}\left(\frac{\log\dfrac{Bi}{\eta \times BC}}{\log \alpha} \times 100 - \frac{La}{\sqrt{2}}\right),$$

wherein a unit of the minimum distance H1 is centimeters.

10. The projection system according to claim 1, wherein the first medium and the second medium include transparent mediums.

11. The projection system according to claim 1, wherein the first medium is air.

12. The projection system according to claim 1, wherein the second medium is liquid or solid.

13. The projection system according to claim 12, wherein the second medium is water.

14. The projection system according to claim 12, wherein the second medium is ice.

15. The projection system according to claim 1, further comprising a tank, and the second medium is disposed in the tank.

16. The projection system according to claim 1, wherein the display system includes a holographic display system or a light field display system.

17. The projection system according to claim 1, wherein the display system includes a display device and a mask located between the display device and the second medium.

18. The projection system according to claim 1, wherein the display system includes a display device and a plurality of lens located between the display device and the second medium.

19. The projection system according to claim 1, further comprising an interactive interface, wherein the interactive interface includes a keyboard, a mouse or a game controller.

20. The projection system according to claim 1, wherein a brightness of the light is at least 300 nits after the light passes through the second medium.

* * * * *